(12) United States Patent
Deorkar et al.

(10) Patent No.: US 6,875,817 B2
(45) Date of Patent: Apr. 5, 2005

(54) FUNCTIONALIZED POLYMERIC MEDIA FOR SEPARATION OF ANALYTES

(75) Inventors: Nandkumar V. Deorkar, Cedar Knolls, NJ (US); James Farina, Nazareth, PA (US); Paul A. Bouis, Bethlehem, PA (US)

(73) Assignee: Mallinckrodt Inc., St. Louis, MO (US)

( * ) Notice: Subject to any disclaimer, the term of this patent is extended or adjusted under 35 U.S.C. 154(b) by 254 days.

(21) Appl. No.: 10/250,570

(22) PCT Filed: Aug. 21, 2001

(86) PCT No.: PCT/US01/26107

§ 371 (c)(1),
(2), (4) Date: Feb. 12, 2003

(87) PCT Pub. No.: WO02/18464

PCT Pub. Date: Mar. 7, 2002

(65) Prior Publication Data

US 2005/0032922 A1 Feb. 10, 2005

Related U.S. Application Data

(60) Provisional application No. 60/228,456, filed on Aug. 29, 2000.

(51) Int. Cl.[7] ............................................. C08F 251/00
(52) U.S. Cl. ...................... 525/244; 525/260; 525/263; 525/283; 525/296; 525/302; 525/303; 525/308
(58) Field of Search ................................. 525/244, 260, 525/263, 283, 296, 302, 303, 308

(56) References Cited

U.S. PATENT DOCUMENTS

| | | | | |
|---|---|---|---|---|
| 5,021,253 A | * | 6/1991 | Dawson-Ekeland et al. | 426/422 |
| 5,599,889 A | * | 2/1997 | Stover et al. | 526/217 |
| 6,117,368 A | * | 9/2000 | Hou | 252/572 |
| 6,303,702 B1 | * | 10/2001 | Davankov et al. | 525/332.2 |
| 6,448,344 B1 | * | 9/2002 | Darling et al. | 525/332.2 |
| 6,534,554 B1 | * | 3/2003 | Mitchell et al. | 521/28 |

FOREIGN PATENT DOCUMENTS

WO  WO 94/24236  10/1994  ........ C10M/169/04

* cited by examiner

Primary Examiner—Helen L. Pezzuto
(74) Attorney, Agent, or Firm—George W. Rauchfuss, Jr.; Christine M. Rabman (57) ABSTRACT

Separation of a variety of analytes that are polar, nonpolar and ionic using functionalized polymeric media is disclosed. Preformed rigid particles of highly crosslinked homopolymer of polyvinylidene compounds are functionalize using the residual vinyl groups onto which monovinyl compounds are covalently bonded through polymerization. The functionalization imparts desirable surface properties for separation applications such as liquid chromatography and solid phase extraction.

47 Claims, 10 Drawing Sheets

FUNCTIONALIZED POLYMERIC MEDIA FOR SEPARATION OF ANALYTES

This application claims benefit to U.S. Provisional Application 60/228,456 filed on Aug. 29, 2000.

FIELD OF THE INVENTION

The invention relates to separation of a variety of analytes that are polar, nonpolar or ionic using functionalize polymeric media. The specification discloses functionalization of polymeric media and use thereof. The functionalization of polymer particles is conducted to impart desirable surface properties for separation applications such as liquid chromatography and solid phase extractions.

BACKGROUND OF THE INVENTION

Chromatographic and solid phase extractive separation of analytes are conducted by contacting mixtures of analyte solutions with solid materials also known as bonded phases/sorbent. Adsorption/desorption (partitions) of analytes on bonded phase leads to the separation of mixtures. (*Practical HPLC Method Development*, L. R. Snyder, J. J. Kirkland, and J. L. Glajch, John Wiley and Sons, 1997; *Solid Phase Extraction for Sample Preparation*, M. Zief, and R. Kisel, J. T. Baker, Phillipsburg, N.J., 1988). The publications and other materials used herein to illuminate the background of the invention or provide additional details respecting the practice, are incorporated by reference, and for convenience are respectively grouped in the appended List of References. Supports are modified to impart the properties that enable separation by various mechanisms such as reversed phase and ion exchange. It is known to make reversed phase bonded phases using silica particles. Due to several drawbacks associated with silica such as instability at acidic and basic conditions, polymers are being considered. Some of the difficulties associated with crosslinked copolymer resins include swelling in the solvents and reduced mechanical strength (F. Nevejam, and M. Verzele, *J. Chromatography* 350:145 (1985)). Accordingly, it is often necessary to employ highly crosslinked but porous polymer particles in which adsorption sites are accessible to analytes. Necessary selectivity of nonfunctional polymer phases is achieved by varying solvents that make up the mobile phase while silica based bonded phases are modified with a combination of polar and nonpolar characteristics that provide desired selectivity. Therefore, proper functionalized polymeric materials and methods to use these are needed that can lead to desired selectivity and separation capability.

It is well known in the prior art to use crosslinked copolymers of monovinylidene and polyvinylidene monomers to produce functionalized polymers. For example, conversion of such polymers to ion exchange resin by sulfonation is described in U.S. Pat. No. 2,366,067. In performing these functionalizations, the polymer backbone is reacted and thus changes properties of those beads that become hydrophilic, making them susceptible to cracking or shattering. In addition, controlled functionalization through a bulk reaction such as sulfonation is difficult. Conversion of hydrophobic to hydrophilic chromatographic media is disclosed in U.S. Pat. No. 5,030,352. These chromatographic media are obtained by applying various thin hydrophilic coatings to the surface of hydrophobic polymer substrates (e.g., polystyrene-DVB). The process includes adsorption of solute having hydrophobic and hydrophilic domains on the substrate by hydrophobic—hydrophobic interactions with the hydrophilic domain extending outwardly away from the surface. The molecules are then crosslinked in place. These coating materials may further be derivatized to produce various materials useful in separations. Such coating is limited to a thin film on the surface of the hydrophobic support and thus capacity is limited. Also, hydrophobicity of the support is diminished and may not be sufficient to adsorb hydrophobic analytes. Meitzner and Oline in U.S. Pat. No. 4,297,220 disclose microreticulated copolymers formed by copolymerization of monoethylenically unsaturated monomers and polyvinylidene monomers in the presence of certain compounds to obtain a specific void volume and surface area that is used for absorbing an organic material from a fluid mixture containing organic materials. Bouvier et al. in U.S. Pat. No. 5,882,521 disclose a method for removing an organic solute from a solution using a water wettable copolymer of hydrophilic and hydrophobic monomers having 12–30 mole percent of hydrophilic monomer.

SUMMARY OF THE INVENTION

The present invention differs substantially from the prior art as it does not involve crosslinked copolymerization of two monovinylidene and polyvinylidene monomers and functionalization of a polymer backbone. It uses a novel approach of surface functionalization of preformed rigid particles using different functional monomers to produce functionalized beads. Furthermore, the disclosed functionalization method significantly reduces the number of reactions and the consumption of reactants and solvents that are needed as compared with other polymer backbone functionalization methods. For example, to make a strong anion exchange medium with a quaternary amine functionality, three stage reactions (bromination or chlorination followed by amination followed by quaternization) are needed. Accordingly, by functionalization of preformed rigid particles that am homopolymers of polyvinylidene monomers, physical properties of the polymer backbone are not affected but critical properties are imparted to the surface that allow useful chromatographic and solid phase extraction separation and eliminate the disadvantages associated with the copolymers. By using the disclosed preparation, highly crosslinked preformed rigid particles prepared by polymerization of polyvinylidene monomers can be functionalized without altering the physical properties of particles (such as mechanical strength and nonswelling). The invention discloses functionalization to impart hydrophilic, cation and anion exchange properties. According to the present invention, preformed rigid porous or nonporous particles of highly crosslinked homopolymer of polyvinylidene compounds are functionalized using the residual vinyl groups, onto which monovinyl compounds are covalently bonded through polymerization. Accordingly, the preformed particles containing residual vinyl groups are suspended and derive in a solution of a monovinyl compound having desired properties such as being hydrophilic or useful as an anion or cation exchanger. As such, the present invention enables high functionalization by long chain polymerization of desired monovinyl compounds on the surface of rigid particles that have high residual vinyl groups.

In accordance with the present invention, significantly different and interesting separation properties have surprisingly been found in the functionalized polymers. These properties lead to liquid chromatographic and solid phase extractive separation of polar, nonpolar and ionic analytes by adsorption and ion exchange mechanisms.

DETAILED DESCRIPTION OF THE INVENTION

The present invention provides a method for separation of a variety of analytes that are polar, nonpolar or ionic using functionalized polymeric media. More particularly, the present invention relates to the functionalization of preformed highly crosslinked polymeric particles to impart desired properties such as hydrophilicity and anion and cation exchange capability. Furthermore, the present invention relates to liquid chromatographic and solid phase extraction separation of a variety of analytes.

The preformed rigid particles that can be functionalized include porous or nonporous polymeric beads prepared by conventional processes such as suspension polymerization. The highly crosslinked polymeric beads prepared using polyvinylidene compounds such as divinylbenzene and trivinylbenzene are preferred due to their high mechanical strength and nonswelling characteristics. In addition, polymerization of divinylbenzene and its self crosslinking leads to sufficient residual vinyl (double) bonds on the surface that are used for surface functionalization using monovinyl compounds. As such, preformed polymeric beads having a large number of residual double bonds are preferred as they can lead to a high degree of functionalization. Furthermore, microporous particles are preferred that can provide high functionality due to a large surface area and access to functional moieties.

The functionalization by postpolymerization of monoethylenically unsaturated compounds (monovinyl compounds) with residual vinyl groups is carried out by free radical initiation. The monomers are selected from a class of compounds that have active moieties such as being polar or cation exchangers or anion exchangers. After polymerization, long chains of polymer containing such active moieties are attached to the surface and the long polymeric chains are extended outwardly away from the polymer bead surface. This configuration does not alter the physical or chemical properties such as mechanical strength, swelling, and hydrophobicity/hydrophilicity of the polymeric backbone of the beads. For example, by controlled postpolymerization (functionalization) with monomers containing active moieties, pockets of active sites are created in the pores along the long polymer chains but retaining hydrophobic pockets on the polymer backbone of the beads. It is found out that these properties can lead to efficient separation of polar analytes as described in the Examples.

The postpolymerization conditions are chosen such that a high functionalization of microporous beads is achieved while maintaining microporosity that allows diffusion of analytes into and out of the pores to achieve the desired separation and analyte recovery.

As described in the Examples, microporous polymeric beads can be prepared using conventional suspension polymerization. The residual vinyl group or unsaturation was determined by a mercury acetate titration method (Das M. N., *Anal. Chem.* 26:1086 (1954)). Accordingly, microporous poly(divinylbenzene) beads were prepared and used to produce functionalized polymeric particles. Polymer beads prepared by homopolymerization of polyvinylidene compounds that have sufficient residual vinyl groups can be used. Suitable polyvinylidene compounds include divinylbenzene, trivinylbenzene, divinylpyridine, divinyltoluene, divinylnaphthalene, ethyleneglycol dimethylacrylate, and N,N-methylene-diacrylamide. Polymer beads from divinylbenzene are preferred due to their high mechanical strength and residual vinyl groups. The polymer bead can have a diameter in the range of 3 to about 100 $\mu$m, preferably about 5–50 $\mu$m; pore diameter of about 60 Å to 1000 Å, preferably 100 Å–300 Å (measured by mercury porosimetry) and surface area of about 70–150 $m^2$/g (measured by mercury porosimetry) and surface area about 150–800 $m^2$/g (measured by nitrogen adsorption).

One embodiment of the present invention is a separating material for separation of various analytes. The separation material is prepared by functionalization of polymeric beads by postpolymerization of monovinyl compounds with residual vinyl groups using free radical polymerization under anaerobic conditions. Suitable free radical catalysts include benzoyl peroxide, tert-butylbenzoate, caproyl peroxide, azodiisobutyronitrile, and azodiisobutyramide.

In one embodiment, the separation material is produced to impart polar properties to the polymeric beads. Suitable monovinyl compounds for functionalization include N-methyl-N-vinylacetamide, aminostyrene, methylacrylate, ethylacrylate, hydroxyethylacrylate, hydroxymethylacrylate, and N-vinylcaprolactam. A preferred monovinyl compound is N-methyl-N-vinylacetamide. The polymer can be functionalized to achieve 0.5–3 mmol of N-methyl-N-vinylacetamide per gram of functionalized polymer. The preferred functionalization that provides good retention of polar compounds is 1.0 to 2.0 mmol of N-methyl-N-vinylacetamide per gram of functionalized polymers. As illustrated in the Examples, increasing the functionalization from 0.5 mmol to 1.5 mmol increases the retention and the separation capability of polar analytes.

In another embodiment, the separation material is produced to impart ionic properties to the polymeric beads so the beads can be utilized for anion and cation exchange separation of analytes. Suitable monovinyl compounds suitable for functionalization include N-(4-vinylbenzyl),N,N-dimethylamine, vinylbenzyltrimethylammonium chloride, 4-vinylbenzoic acid, styrene sulfonic acid (also called N-vinylbenzene sulfonic acid), and methacrylic acid. In addition, polymer bead postpolymerized using glycidylmethacrylate with residual vinyl groups can be further reacted with ethylenediamine, diethylamine, polyethylemeimine, hydroxypropyl sulfonic acid, hydroxylbenzene sulfonic acid or hydroxybenzoic acid to form ionic functional sites on the postpolymerized polymer to yield functional polymers.

In another aspect of this invention the functionalized polymers are used for separation of analyte by liquid chromatography and solid phase extraction. The functioned polymers are useful in a number of ways as illustrated in the Examples. For example, recovery of polar organic analytes such as acetaminophen, niacinamide and resorcinal is substantially higher on the functionalized polymers due to the presence of polar groups than is their recovery on the nonfunctional DVB polymer or on octadecyl modified silica ($C_{18}$-bonded silica). Also, the functionalized polymer is shown to have high adsorption capacity. As shown in the Examples, for nonfunctional DVB aid $C_{18}$ recovery is lower for a highly concentrated solution of acetaminophen (0.1 mg/mL) than for a less concentrated solution (0.01 mg/mL), whereas the functionalized DVB recovery remains high (quantitative) at both concentration levels. Also, it was discovered that when the functionalized polymers are packed in a liquid chromatographic column and used for separation, organic acids as well as isomers (cis and trans) of organic acids can be separated using a pure aqueous mobile phase.

Furthermore, it has been found that when using a functionalized polymer having ionic characteristics, analytes can be separated by a combination of ion exchange and reversed phase mechanisms. As such, a better separation of ionic and hydrophobic analyte can be achieved. As illustrated in the Examples, an acidic analyte such as sulindac that possesses a carboxylic acid group is retained on an ionic functionalized polymer as well as on other polymers (nonionic and nonfunctionalized) and $C_{18}$. However, the analyte is washed from the nonionic materials with the first methanol wash, while no analyte was washed from an ionic functionalized polymer with the first methanol wash. After washing with an acid such as 1 N hydrochloric acid followed by methanol (acidified), the analyte was recovered quantitatively. This provides a very effective method for separation of acidic analytes from hydrophobic analytes.

The present invention is further detailed in the following Examples, which are offered by way of illustration and are not intended to limit the invention in any manner. Standard techniques well known in the art or the techniques specifically described below are utilized.

EXAMPLES

Preparation of Poly(divinylbenzene) (DVB) Beads

DVB polymer beads were produced by conventional suspension polymerization using 80% DVB, benzoyl peroxide as the initiator, and toluene as the pore forming agent. The polymer contained 0.2 meq/g of residual vinyl groups. The pore diameter was 180 Å and the surface area measured by mercury porosimetry was 95 $m^2/g$. Elemental analysis showed no nitrogen present

Example 1

To a clean dry one liter round bottom flask was added: 350 g water, 4 g polyvinyl alcohol, and 4 g sodium chloride. DVB polymer (15 g) was added to the flask. In a 25 mL beaker were added: 4 g of aminostyrene, 0.3 g of azodiisobutyronitrile (AIBN), and 20 g toluene. The reaction mixture was stirred to dissolve the reagents. The monomer mixture was added to the flask. The flask was purged of all air and nitrogen was added to make an inert atmosphere. The flask was heated overnight at 75EC. The product was filtered on dynel cloth, wed 2× with 200 mL deionized water, and one time with 200 mL of methanol. The product was dried overnight in a vacuum oven at 80EC. Elemental analysis of the polymer product showed nitrogen at 2.4%. This polymer product was then treated with acetyl chloride (10 g) in 100 mL of tetrahydrofuran in the presence of triethylamine (6 g) for 4 hours at room temperature. Elemental analysis of the polymer showed nitrogen at 2.3% which is equivalent to 1.6 mmol of aminostyrene per gram of final product.

Example 2

To a clean dry 250 mL round bottom flask 75 g ethanol was added. DVB polymer (15 g) was added to the flask. In a 25 mL beaker were added: 5 g of N-methyl-N-vinylacetamide and 0.2 g of AIBN, and 10 mL ethanol was added and the contents stirred to dissolve the reagents. The monomer mixture was added to the flask. The flask was purged of all air and nitrogen was added and the contents were stirred at 100 rpm. The rotating flask was heated overnight at 75EC. The product was filtered on dynel cloth, washed 2× with 200 mL deionized water, and one time with 200 mL of methanol. The product was dried overnight in a vacuum oven at 80EC. Elemental analysis of the polymer product (15 g) showed 1.9% nitrogen, equivalent to 1.36 mmol of N-methyl-N-vinylacetamide per gram of final product. The surface area as measured by mercury porosimetry was 126 $m^2/g$ and the pore diameter was 173 Å.

Example 3

A clean three neck round bottom flask was equipped with a mechanical stirrer, nitrogen bubbler, and reflux condenser. To the flask were added: 200 g of ethanol and 40 g of DVB polymer. The stirring was started and set at 300 rpm. In a 50 mL beaker 10.5 g of N-methyl-N-vinylacetamide and 0.6 g of AIBN were added with 20 mL ethanol and stirred to dissolve. The monomer mixture was added to the round bottom flask. The mixture was stirred at 300 rpm at 75EC for 16 hours. The product was filtered on dynel cloth, washed 2× with 200 mL deionized water, and one time with 200 mL of methanol. The product was dried overnight in a vacuum oven at 80EC. Elemental analysis of the polymer product (42 g) showed 0.7% nitrogen, equivalent to 0.5 mmol of N-methyl-N-vinylacetamide per gram of final product.

Example 4

A clean three neck round bottom flask was equipped with a mechanical stirrer, nitrogen bubbler, and reflux condenser. To the flask were added: 200 g of ethanol and 45 g of DVB polymer. The stirring was started and set at 300 rpm. To a 50 mL beaker were added 20 g of N-methyl-N-vinylacetamide and 0.6 g of AIBN with 20 mL ethanol and these were stirred to dissolve the reagents. The monomer mixture was added to the round bottom flask. The mixture was stirred at 300 rpm at 80EC for 16 hours. The product was filtered on dynel cloth, washed 2× with 200 mL deionized water, and one time with 200 mL of methanol. The product was dried overnight in a vacuum oven at 80EC. Elemental analysis of the polymer product (48 g) showed 1.8% nitrogen, equivalent to 1.2 mmol of N-methyl-N-vinylacetamide per gram of final product.

Example 5

A clean three neck round bottom flask was equipped with a mechanical stirrer, nitrogen bubbler, and reflux condenser. To the flask were added 800 g of ethanol and 200 g of DVB polymer. The stirring was started and set at 300 rpm. To a 250 mL beaker were added 89 g of N-methyl-N-vinylacetamide and 2.68 g of AIBN with 100 mL of ethanol and these were stirred to dissolve. The monomer mixture was added to the round bottom flask. The mixture was stirred at 300 rpm at 80EC for 16 hours. The product was filtered on dynel cloth, washed 2× with 1 L deionized water, and one time with 1 L of methanol. The product was dried overnight in a vacuum oven at 80EC. Elemental analysis of the polymer product showed 2.1% nitrogen, equivalent to 1.5 mmol of N-methyl-N-vinylacetamide per gram of final product. This polymer was extracted overnight with ethyl acetate to determine the stability of functionalization. No change in the elemental analysis was observed, thus showing a covalent bonding of N-methyl-N-vinylacetamide to the DVB.

Example 6

A clean three neck round bottom flask was equipped with a mechanical stirrer, nitrogen bubbler, and reflux condenser. To the flask were added 200 g of ethanol and 45 g of DVB polymer. The stirring was started and set at 300 rpm. To a 50 mL beaker were added 20 g of N-methyl-N-vinylacetamide and 0.6 g of AIBN with 25 mL ethanol and these were stirred to dissolve the reagents. The monomer mixture was added to the round bottom flask. The mixture was stirred at 300 rpm at 80EC for 16 hours. The product was filtered on dynel cloth, washed 2× with 1 L deionized water, and one time with 1 L of methanol. The product was dried overnight in a vacuum oven at 80EC. Elemental analysis of the polymer product (48 g) showed 1.9% nitrogen, equivalent to 1.36 mmol of N-methyl-N-vinylacetamide per gram of final product.

Example 7

A clean three neck round bottom flask was equipped with a mechanical stirrer, nitrogen bubbler, and reflux condenser. To the flask were added 150 g of ethanol and 30 g of DVB polymer. The sting was started and set at 300 rpm. To a 50 mL beaker were added 13 g of glycidylmethacrylate and 0.4 g of AIBN with 20 mL ethanol and these were sired to dissolve. The monomer mixture was added to the round bottom flask. The mixture was red at 300 rpm at 80EC for 16 hours. The product was filtered on dynel cloth, washed 2× with 200 mL deionized water, and one time with 200 mL of methanol. The product was dried overnight in a vacuum oven at 80EC. FT-IR of the polymer product (32 g) showed a peak at 1250 cm$^{-1}$, typical for an epoxide ring.

Example 8

The following reaction produced a weak anion exchange medium having primary and secondary functional amines. A clean three neck round bottom flask was equipped with a magnetic stirrer, nitrogen bubbler, and reflux condenser. To the flask were added 15 g of polymer from Example 7, 250 mL THF and 50 g of ethylenediamine. The mixture was refluxed for 8 hours under nitrogen. The product was filtered on dynel cloth, washed 2× with 200 mL deionized water, and one time with 200 mL methanol. The product was dried overnight in a vacuum at 80EC. Element analysis of the polymer product (16 g) showed 2.9% nitrogen.

Example 9

The following reaction produced a weak anion exchange medium having a tertiary amine functionality. A clean round bottom flask was equipped with a magnetic stirrer, nitrogen bubbler, and reflux condenser. To the flask were added 15 g of the product of Example 7, 250 mL THF and 50 g of diethylamine. The mixture was refluxed for 8 hours under nitrogen. The product was filtered on dynel cloth, washed 2× with 200 mL deionized water, and one time with 200 mL methanol. The product was dried overnight in a vacuum at 80EC. Elemental analysis of the polymer product showed 0.8% nitrogen. Anion exchange capacity was 0.12 meq/g.

Example 10

The following reaction produced a weak anion exchange medium having a tertiary amine functionality. A clean three neck round bottom flask was equipped with a mechanical stirrer, nitrogen bubbler, and reflux condenser. To the flask were added 300 g of ethanol and 45 g of DVB polymer. The stirring was started and set at 300 rpm. To a 50 mL beaker were added 20 g of N-(4-vinylbenzyl)-N-N-diethylamine and 0.6 g of AIBN with 25 mL ethanol and this was stirred to dissolve the reagents. The monomer mixture was added to the round bottom flask. The mixture was stirred at 300 rpm at 80EC for 16 hours. The product was filtered on dynel cloth, washed 2× with 200 mL deionized water, and one time with 200 mL of methanol. The product was dried overnight in a vacuum oven at 80EC. Elemental analysis of the polymer product (47 g) showed 0.84% nitrogen. The pore diameter was 125 Å.

Example 11

The following reaction produced a strong anion exchange medium having a quaternary amine functionality. A clean three neck round bottom flask was equipped with a mechanical stirrer, nitrogen bubbler, and reflux condenser. To the flask were added 300 g of ethanol and 30 g of DVB polymer.

The stirring was started and set at 300 rpm. To a 50 mL beaker were added 15 g of vinylbenzyltrimethylammonium chloride and 0.6 g of AIBN with 20 mL ethanol and these were stirred to dissolve. The monomer mixture was added to the round bottom flask. The mixture was stirred at 300 rpm at 80EC for 16 hours. The product was filtered on dynel cloth, washed 2× with 200 mL deionized water, and one time with 200 mL of methanol. The product was dried overnight in a vacuum oven at 80EC. Elemental analysis of the polymer product (31 g) showed 1.4% nitrogen. Anion exchange capacity was 0.6 meq/g.

Example 12

To a clean dry 500 mL round bottom flask were added 300 g ethanol and 30 g DVB polymer. To a 50 mL beaker were added 20 g of styrene sulfonic acid and 0.6 g of AIBN dissolved in 25 mL ethanol and the contents were stirred to dissolve the reagents. The monomer mixture was added to the round bottom flask. The flask was purged of all air and placed under a nitrogen atmosphere and stirred at 100 rpm. The flask was heed overnight at 80EC. The product was filtered on dynel cloth, washed 2× with 200 mL deionized water, and one time with 200 mL of methanol. The product was dried overnight in a vacuum oven at 80EC. Elemental analysis of the polymer product (34 g) showed 3.5% sulfur. Cation exchange capacity was 0.6 meq/g.

Example 13

To a clean dry 500 mL round bottom flask were added 300 g ethanol and 20 g DVB polymer. To a 50 mL beaker were added 20 g of methacrylic acid and 0.6 g of AIBN dissolved in 25 mL ethanol, and these were stirred to dissolve. The monomer mixture was added to the round bottom flask. The flask was purged of all air and placed under an inert nitrogen atmosphere and stirred at 100 rpm. The flask was heated overnight at 80EC. The product was filtered on dynel cloth, washed 2× with 200 mL deionized water, and one time with 200 mL of methanol. The product was dried overnight in a vacuum oven at 80EC. Cation exchange capacity was 0.9 meq/g. FT-IR of the polymer product showed an acid carbonyl peak at 1750 $cm^{-1}$.

Example 14

Figure 1:
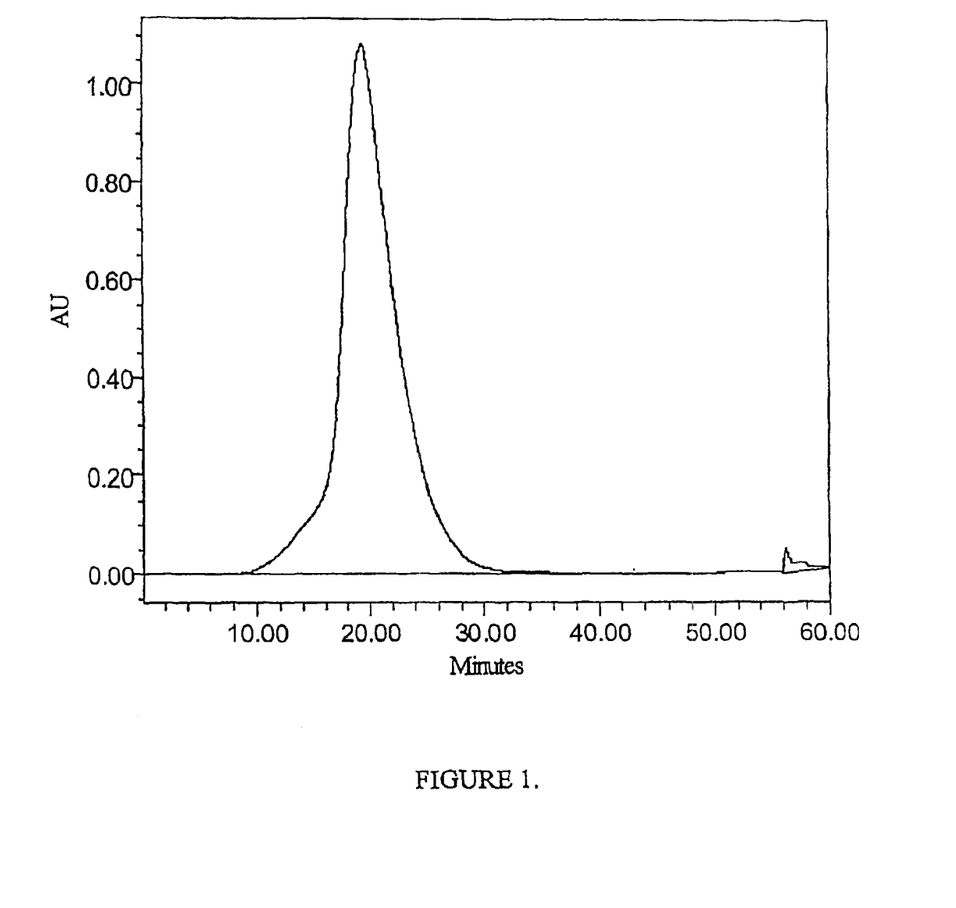
FIG. 1 is a graph which shows retention of acetaminophen on nonfunctionalized DVB when deionized water is used as the mobile phase for up to 55 minutes, eluted with methanol by changing from deionized water to methanol at 55 minutes. Acetaminophen leached during the water run and no peak eluted with methanol, thus showing poor/no retention.
Figure 2:
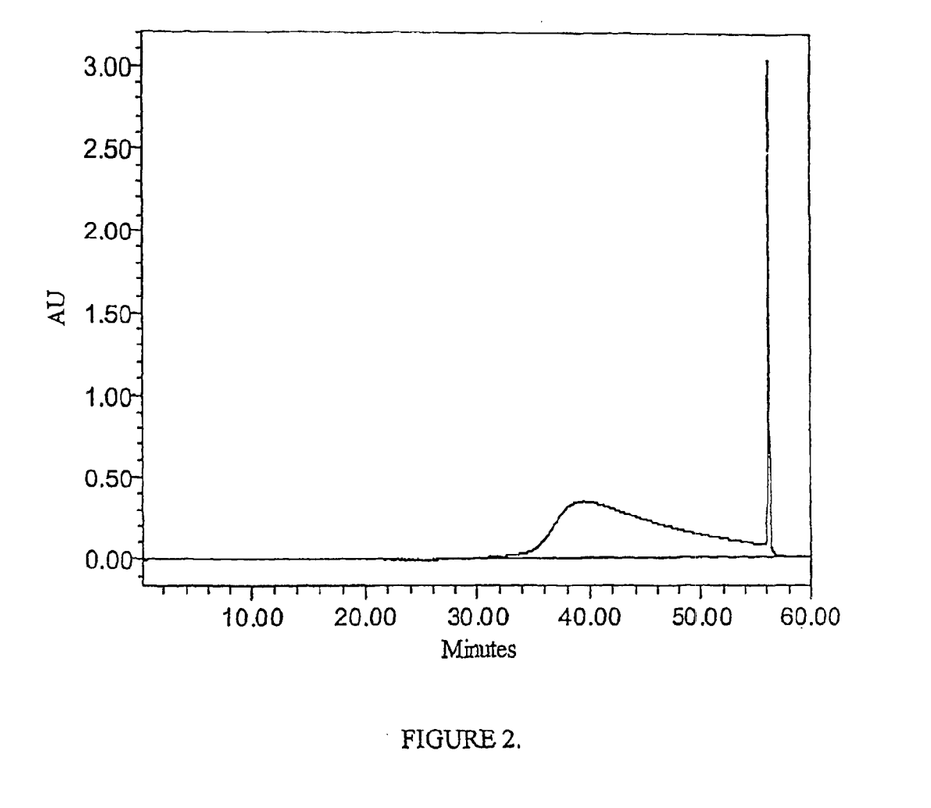
FIG. 2 is a graph which shows retention of acetaminophen on DVB functionalized with 0.5 mmol N-methyl-N-vinylacetamide (Example 3) when deionized water is used as the mobile phase for up to 55 minutes, eluted with methanol by changing from ionized water to methanol at 55 minutes. Some acetaminophen (approximately 30%) leached during the water run at 35 minutes and a peak eluted with methanol thereby showing improved retention as compared to retention on nonfunctionalized DVB.
Figure 3:
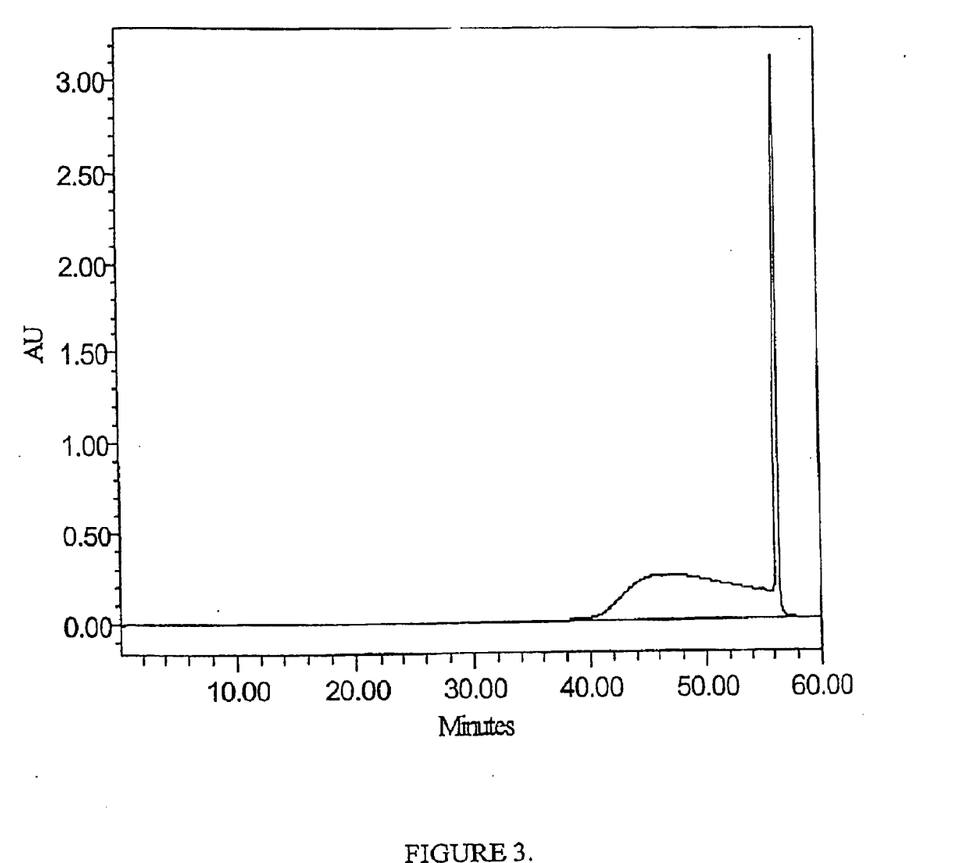
FIG. 3 is a graph which shows retention of acetaminophen on DVB functionalized with 1.2 mmol N-methyl-N-vinylacetamide (Example 4) when deionized water is used as the mobile phase for up to 55 minutes, eluted with methanol by changing from ionized water to methanol at 55 minutes. Some acetaminophen (15%) leached much later during the water run at 45 minutes and a peak eluted with methanol thus showing a further improvement in retention.
Figure 4:
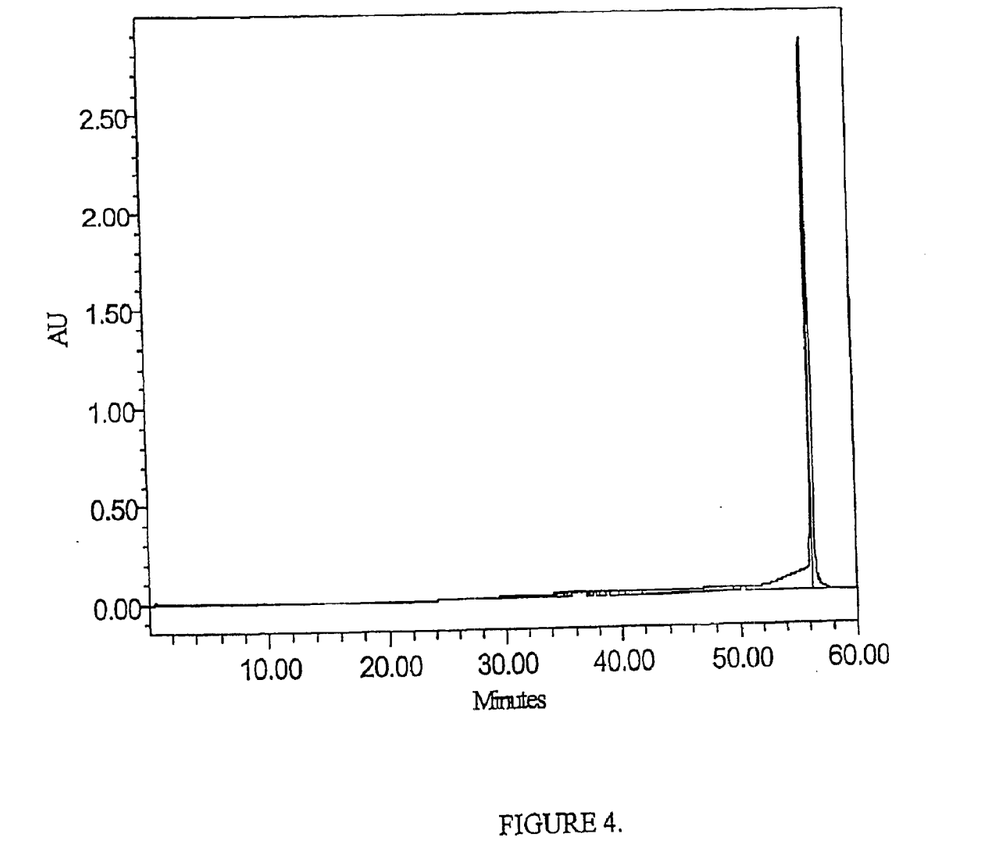
FIG. 4 is a graph which shows retention of acetaminophen on DVB functionalized with 1.36 mmol N-methyl-N-vinylacetamide (Example 6) when deionized water is used as the mobile phase for up to 55 minutes, eluted with methanol by changing from ionized water to methanol. A negligible amount of acetaminophen leached during the run and a peak eluted with methanol, thus showing further improvement in retention and good recovery by methanol elution.
Figure 5:
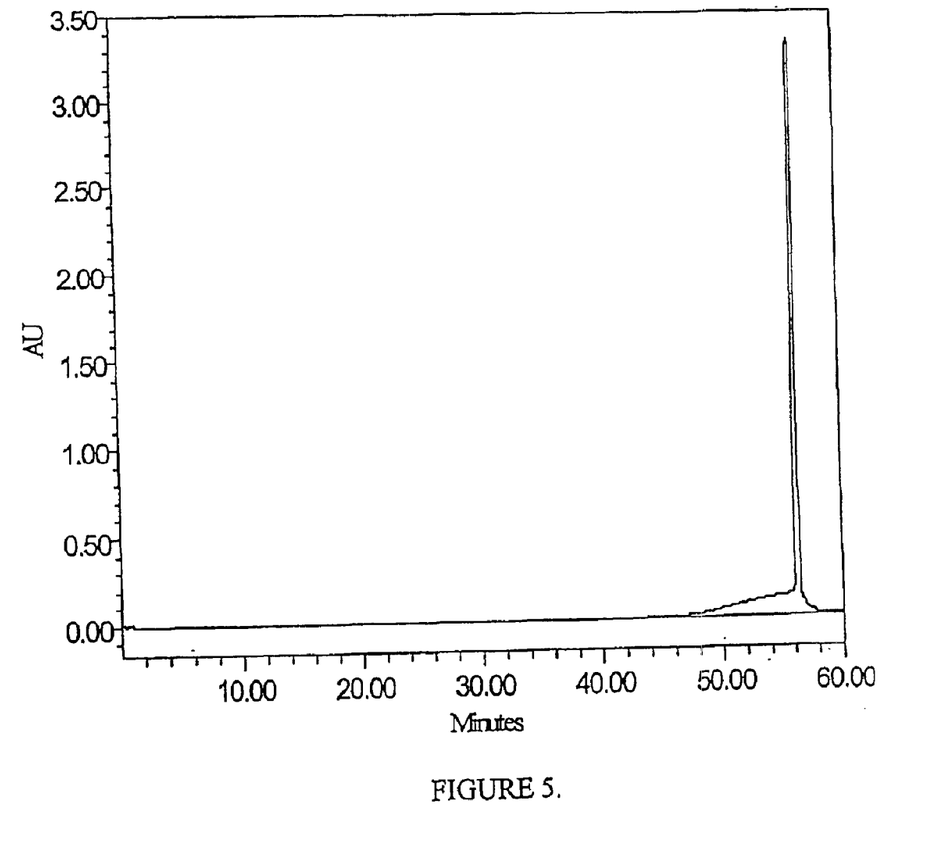
FIG. 5 is a graph which shows retention of acetaminophen on DVB functionalized with 1.5 mmol N-methyl-N-vinylacetamide (Example 5) when deionized water is used as the mobile phase for up to 55 minutes, eluted with methanol by changing from deionized water to methanol at 55 minutes. Negligible amounts of acetaminophen leached during the water run and a peak eluted with methanol, thus showing good retention and recovery by methanol elution.
Figure 6:
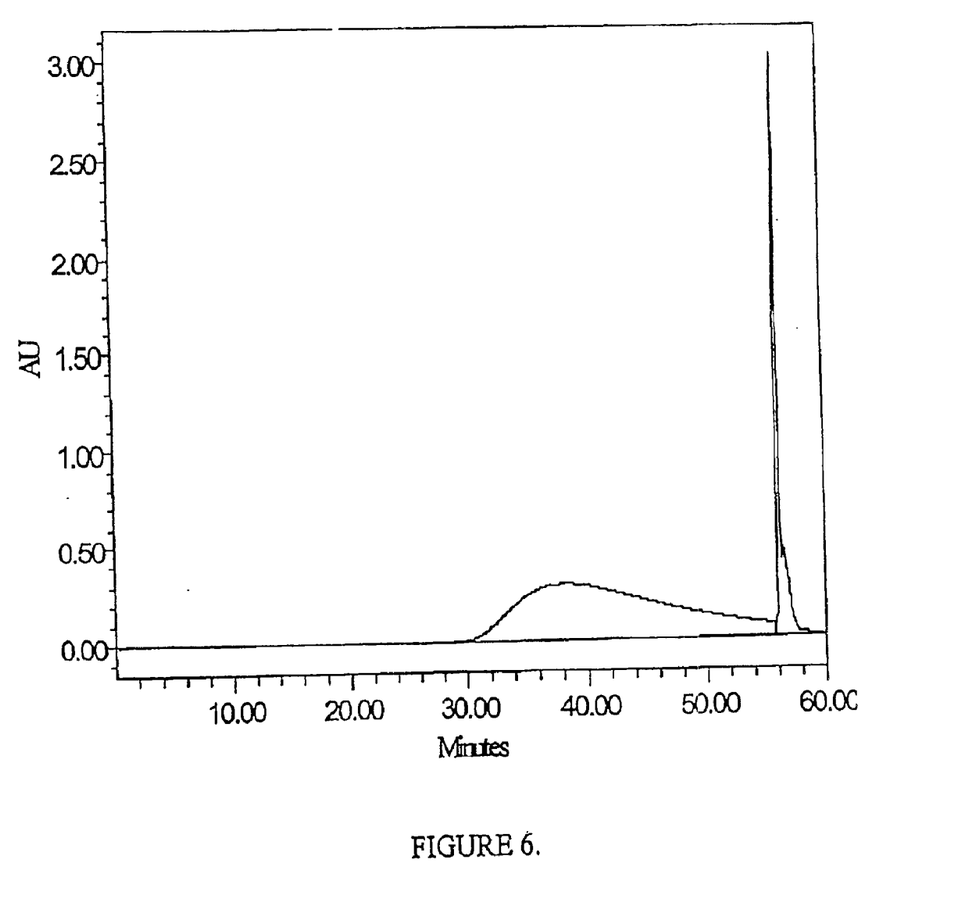
FIG. 6 is a graph which shows retention of acetaminophen on DVB functionalized with 1.6 mmol aminostyrene (Example 1) when deionized water is used as the mobile phase for up to 55 minutes, eluted with methanol by changing from deionized water to methanol at 55 minutes. A peak eluted with methanol showing substantially higher retention than on nonfunctionalized DVB.

The retention efficiencies of polar, water soluble analytes were determined using a small HPLC column (4.6×50 mm) packed with approximately 0.25–0.30 g of DVB or functionalized DVB polymers. First the column was washed with 5 mL methanol followed by 10 mL of deionized water. Then 200 µL of acetaminophen solution (1.0 mg/mL in water) was injected and the chromatographic run was continued using water for 55 minutes. At 55 minutes the mobile phase was changed to methanol. Retention efficiency was determined from peak area prior to 55 minutes (when pure water is run) and after 55 minutes (when pure methanol is used for elution). Results are shown in FIGS. 1–6. The functionalized DVB (Example 5) shows high retention of acetaminophen as acetaminophen did not leach during the water wash but eluted after 55 minutes with methanol. As shown in FIG. 1, with nonfunctionalized DVB most of the acetaminophen was leached with water, and showed poor retention. By increasing the functionalization level of N-methyl-N-vinylacetamide (%N from 0.7–2.0) acetaminophen is retained and recovered quantitatively (FIGS. 1–5). Similar retention behavior was observed with aminostyrene functionalized polymers (FIG. 6).

Example 15

Recovery of analytes by solid phase extraction (SPE) with functionalized polymer was determined using SPE columns (1 m/L) packed with 20 mg of DVB or functionalized DVB (from Example 5) that retains/absorbs analyte by a reversed phase mechanism. These columns were used for extraction and recovery of various analytes from dilute solutions. The SPE columns were placed on a positive pressure processor (the device forces liquid to go through the column by using pressurized air or nitrogen). The SPE column was conditioned by passing 1 mL methanol followed by 1 mL of deionized water. Then 1 mL of analyte feed solution (0.01–0.1 mg/mL) in phosphate buffet (20 mM, pH 5.0–8.0) was passed through the column at a flow rate of 2–3 mL/minute. After washing the column with 1 mL of deionized water, analyte was eluted from the column with methanol (500 µL). The concentration of analyte in the starting feed solution and in the eluted solution was determined by high performance liquid chromatography and was used to compute recovery of analyte. The results are summarized in Table 1. The results show that functionalized DVB showed a high recovery of polar analytes. Also, by increasing the acetaminophen concentration from 0.01–0.1 mg/mL, no loss in acetaminophen was observed indicating a high adsorption capacity.

TABLE 1

SPE Recovery Of Various Analytes

| | | % Recoveries | | |
| --- | --- | --- | --- | --- |
| Compound | Extraction Conditions | DVB | Functionalized DVB (Example 5) | $C_{18}$ |
| Acetaminophen | 0.1 mg/mL in 20 mM $KH_2PO_4$, pH 6.0 | 91.0 | 101.0 | 22.0 |
| Acetaminophen | 0.01 mg/mL in 20 mM $KH_2PO_4$, pH 6.0 | 95.0 | 98.6 | 50.0 |
| Resorcinol | 0.1 mg/mL in 10 mM $KH_2PO_4$, pH 6.0 | 55.0 | 99.0 | 0.0 |
| Pindolol | 0.05 mg/mL in 20 mM $KH_2PO_4$, pH 8.0 | 106.0 | 100.0 | 98.0 |
| Procainamide | 0.01 mg/mL in 20 mM $KH_2PO_4$, pH 8.0 | 96.8 | 101.0 | 98.2 |
| Primidone | 0.05 mg/mL each in 20 mM $KH_2PO_4$, pH 6.0 | 100.7 | 98.2 | 98.1 |
| Phenobarbital | | 98.1 | 98.7 | 98.1 |
| Niacinamide | 0.05 mg/mL in 20 mM $KH_2PO_4$, pH 9.0 | 0.0 | 43.0 | 0.0 |
| Bupivacaine | 0.05 mg/mL in 20 mM $KH_2PO_4$, pH 6.0 | 86.7 | 100.3 | 92.4 |

Separation efficiency of organic acids was evaluated by HPLC (high performance liquid chromatography) using DVB and functionalized DVB (Example 5) packed columns (4.6×150 mm). Columns were slurry packed (3.8 g in 22 mL chloroform-isopropanol, 85:15 mixture) at 4500 psi. Potassium phosphate, pH 3.0 buffer (20 mM) was used as a mobile phase. A 60 L mixture of tartaric acid, malonic acid and succinic acid containing 10:g, 25:g, and 375 g respectively was injected and chromatographic peaks were recorded at 210 nm. Similar injections of individual components of the mixture were made to determine retention times of each of the components.

Figure 7:
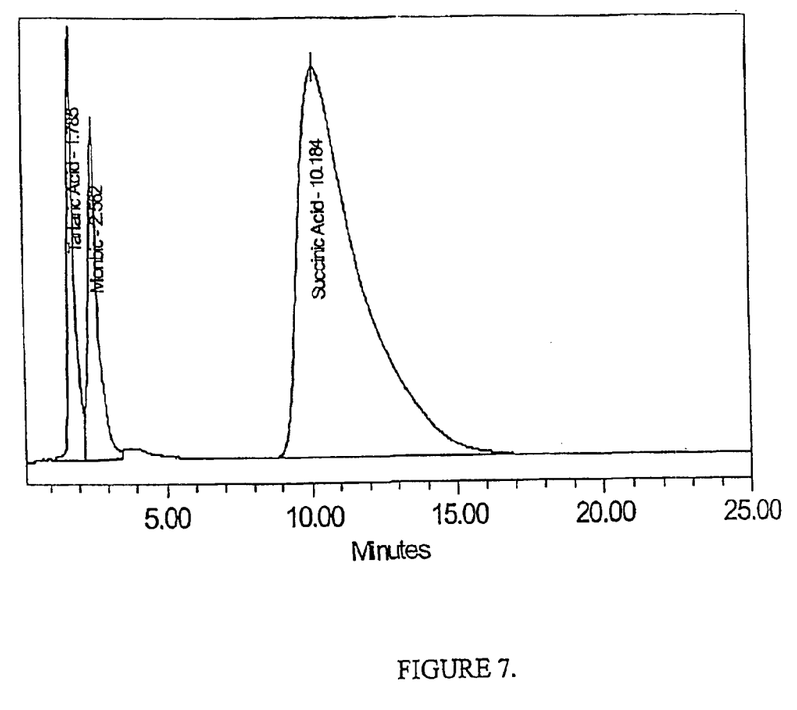
FIG. 7 is a graph which shows chromatographic separation of an organic acid mixture consisting of tartaric acid, malonic acid and succinic acid using a column packed with nonfunctionalized DVB.
Figure 8:
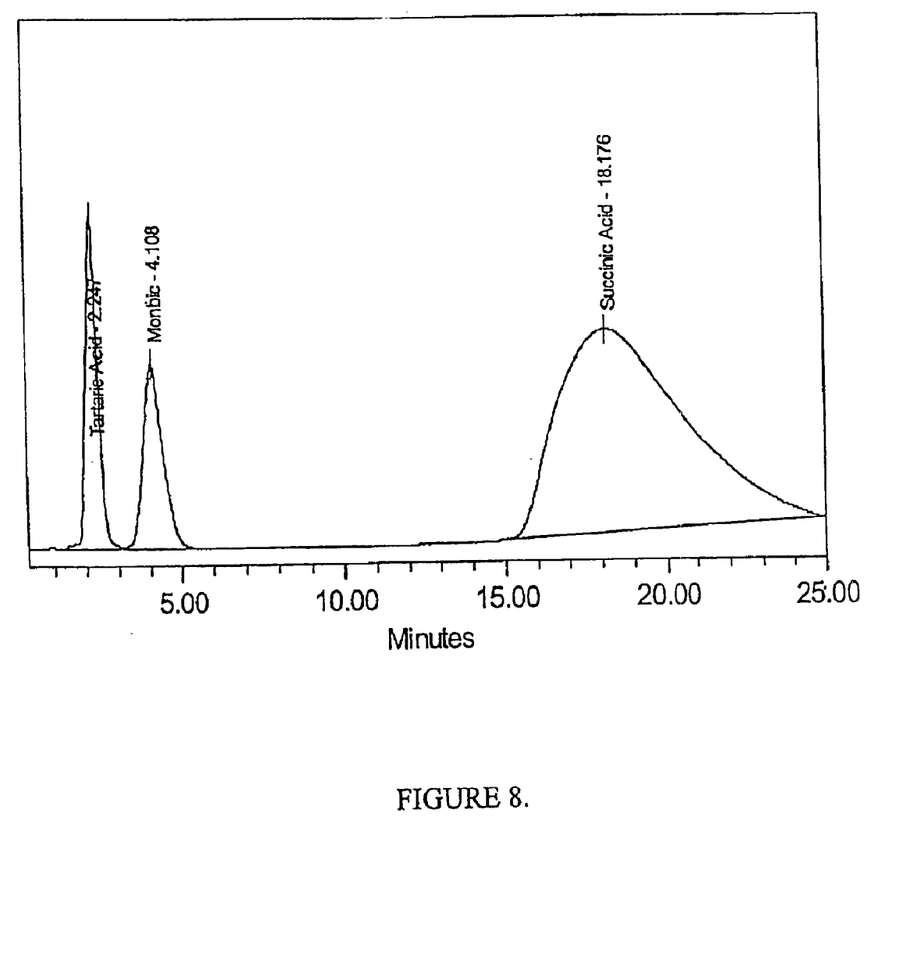
FIG. 8 is a graph which shows chromatographic separation of an organic acid mixture consisting of tartaric acid, malonic acid, and succinic acid using a column packed with functionalized DVB from Example 5.
Figure 9:
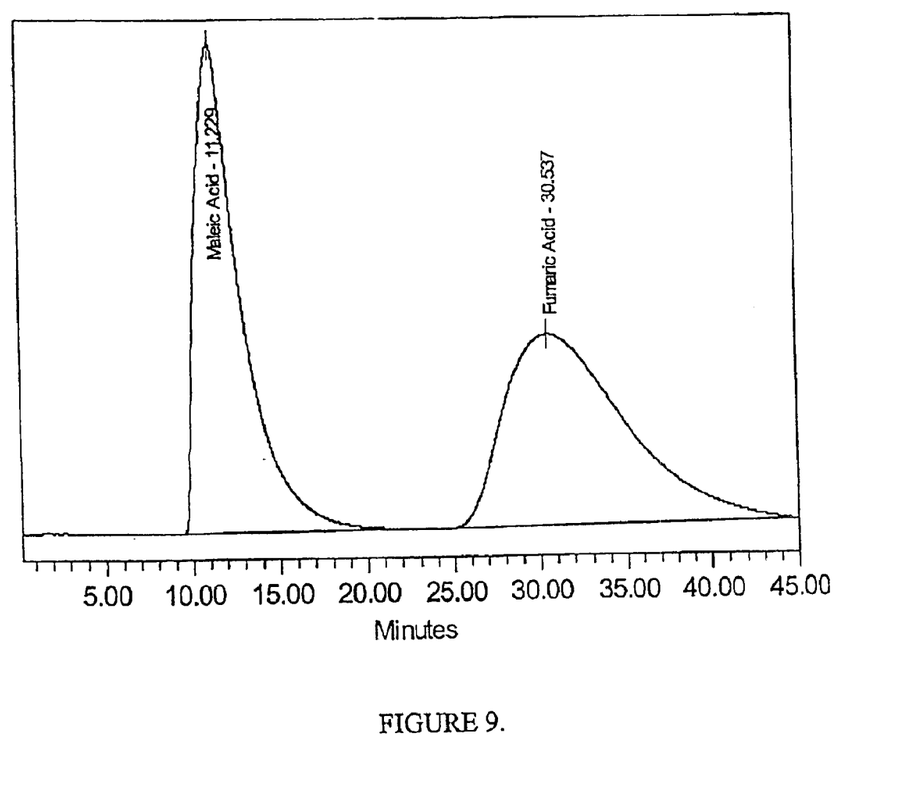
FIG. 9 is a graph which shows chromatographic separation of maleic acid (cis 1,2-ethylene dicarboxylic acid) and fumaric acid (trans 1,2-ethylene dicarboxylic acid) using a column packed with functionalized DVB from Example 5.
Figure 10:
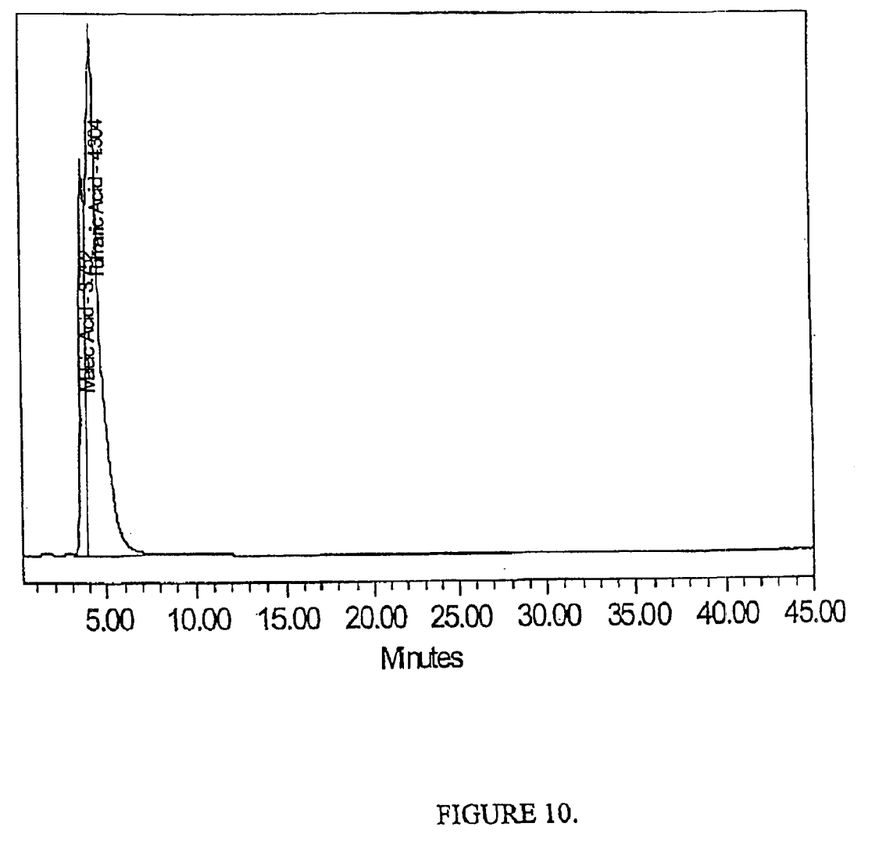
FIG. 10 is a graph which shows chromatographic separation of maleic acid (cis 1,2-ethylene dicarboxylic acid) and fumaric acid (trans 1,2-ethylene dicarboxylic acid) using a column packed with nonfunctionalized DVB.

As shown in FIG. 7, the retention times of tartaric acid, malonic acid, and succinic acid are 1.8, 2.6, and 10.2 minutes, respectively. The results show poor separation of tartaric acid and malonic acid with nonfunctionalized DVB. Functionalization with N-methyl-N-vinylacetamide onto the surface of the polymer resulted in an improved separation medium as the separation efficiency of all three components improved significantly (FIG. 8). Also, retention time of all three components increased significantly. The separation can be attributed to branching of long chain N-methyl-N- vinylacetamide containing polar amide moieties that is extended away from the polar surface. It was also discovered that a functionalized DVB (Example 5) can separate cis-trans acids. A mixture of the cis form of 1,2-ethylenedicarboxylic acid (maleic acid) and the tans form of 1,2-ethylenedicarboxylic acid (fumaric acid) was separated with functionalized DVB using 20 mM potassium phosphate, pH 3.0 buffer as a mobile phase FIG. 9), whereas both components co-eluted with nonfunctionalized DVB (FIG. 10).

Example 17

Recovery of analytes by solid phase extraction (SPE) with functionalized polymer was determined using SPE columns (1 mL) packed with 20 mg DVB or a strong anion exchange (quat) functionalized DVB (from Example 11) that retained analyte by ionic interaction and also by a reversed phase mechanism. It was demonstrated that acidic analyte can be separated by mixed interactions. The SPE columns were placed on a positive pressure processor. The SPE columns were conditioned by passing 1 mL methanol, followed by 0.1 N NaOH, and 1 mL of deionized water. Then 1 mL of acidic analyte feed solution (0.05 mg/mL) in 0.01 N NaOH was passed through the column at a flow rate of 2–3 mL/minute. First the column was washed with 1 mL methanol to remove other hydrophobic analytes while the acidic analyte was retained on the column. Then the column was washed with 1 N HCl to convert the ionic analyte to an acid form and to disturb ionic interactions whereby the acidic analyte was retained by a reversed phase mechanism. Finally, the acidic analyte was eluted with 1 mL acidified methanol (90:10, methanol:1N HCl). The concentrations of acidic analyte in the first methanol wash and the final methanol eluate were determined by HPLC to calculate the recoveries (Table 2). As shown in Table 2, functionalized DVB (Example 11) that has anion exchange sites retains the acidic analyte by an ionic as well as a reverse phase mechanism. Thus, analyte is not washed off with the first methanol wash but is eluted with the final acidified methanol when no ionic interaction exists. For functionalized DVB (Example 5), nonfunctionalized DVB and $C_{18}$, analyte is washed off with the first methanol wash and shows no separation capability of acidic and hydrophobic analytes. Similarly, recovery of salicylic acid with functionalized DVB (Example 5), nonfunctionalized DVB and $C_{18}$ is very poor as salicylic acid is not retained on the columns.

TABLE 2

% Recovery of Acidic Analyte

| | Compound | |
|---|---|---|
| | Sulindac | Salicylic Acid |
| Quat Functionalized DVB (Example 11) | | |
| First Methanol Wash | 0.0 | 0.0 |
| Final Methanol Eluate | 85.6 | 94.4 |
| Functionalized DVB (Example 5) | | |
| First Methanol Wash | 96.1 | 9.4 |
| Final Methanol Eluate | 0.0 | 0.0 |
| DVB | | |
| First Methanol Wash | 92.7 | 0.0 |
| Final Methanol Eluate | 0.0 | 0.0 |
| $C_{18}$ | | |
| First Methanol Wash | 93.0 | 0.0 |
| Final Methanol Eluate | 0.0 | 0.0 |

While the invention has been disclosed in this patent application by reference to the details of preferred embodiments of the invention, it is to be understood that the disclosure is intended in an illustrative rather than in a limiting sense, as it is contemplated that modifications will readily occur to those skilled in the art, within the spirit of the invention and the scope of the appended claims.

LIST OF REFERENCES

Das MN (1954). *Anal. Chem.* 26:1086.
Nevejam F and Verzele M (1985). *J. Chromatography* 350:145.
Snyder L R, Kirkland J J and Glajch J L (1997). *Practical HPLC Method Development*, John Wiley and Sons.
Zief M and Kisel R (1988). *Solid Phase Extraction for Sample Preparation*, J. T. Baker, Phillipsburg, N.J.
U.S. Pat. No. 2,366,007
U.S. Pat. No. 4,297,220
U.S. Pat. No. 5,030,352
U.S. Pat. No. 5,882,521

What is claimed is:

1. Functionalized polymer beads prepared by
   a) polymerizing a polyvinylidene monomer to form a self-crosslinked homopolymer; and then
   b) polymerizing a functional monomer to covalently bond to said homopolymer.

2. The functionalized polymer beads of claim 1 wherein said polyvinylidene monomer is selected from the group consisting of divinylbenzene, trivinylbenzene, divinylpyridine, divinyltoluene, divinylnaphthalene, ethyleneglycol dimethylacrylate and N,N-methylenediacrylamide.

3. The functionalized polymer beads of claim 2 wherein said polyvinylidene monomer is divinylbenzene.

4. The functionalized polymer beads of claim 1 wherein said homopolymer is poly(divinylbenzene).

5. The functioned polymer beads of claim 1 wherein said functional monomer is a monovinyl compound.

6. The functionalized polymer beads of claim 5 wherein said monovinyl compound bears a polar moiety or an ionic moiety.

7. The functionalized polymer beads of claim 1 wherein said functional monomer is selected from the group consisting of N-methyl-N-vinylacetamide, aminostyrene, methylacrylate, ethylacrylate, hydroxymethylacrylate, hydroxyethylacrylate and N-vinylcaprolactam.

8. The functionalized polymer beads of claim 7 wherein said functional monomer is N-methyl-N-vinylacetamide.

9. The functionalized polymer beads of claim 8 wherein said beads comprise 0.5–3.0 millimoles of N-methyl-N-vinylacetamide per gram of functionalized polymer beads.

10. The functionalized polymer beads of claim 1 wherein said functional monomer is selected from the group consisting of N-(4-vinylbenzyl)-N,N-dimethylamine, vinylbenzyltrimethylammonium chloride, 4-vinylbenzoic acid, styrene sulfonic acid and methacrylic acid.

11. The functionalized polymer beads of claim 1 wherein said functional monomer is glycidylmethacrylate.

12. The functionalized polymer beads of claim 11 which are further reacted with ethylenediamine, diethylamine, polyethyleneimine, hydroxypropyl sulfonic acid, hydroxylbenzene sulfonic acid or hydroxybenzoic acid.

13. The functionalized polymer beads of claim 11 which are further reacted with ethylenediamine.

14. A method for preparing a functionalized polymer bead, said method comprising the steps of:
   a) polymerizing a polyvinylidene monomer to form a homopolymer; and then
   b) polymerizing a functional monomer which covalently binds to said homopolymer.

15. The method of claim 14 wherein following step (a) residual vinyl groups remain on said homopolymer.

16. The method of claim 14 wherein said functional monomers form a functional polymer which is covalently bonded to said homopolymer via a residual vinyl group.

17. The method of claim 14 wherein said polyvinylidene monomer is selected from the group consisting of divinylbenzene, trivinylbenzene, divinylpyridine, divinyltoluene, divinylnaphthalene, ethyleneglycol dimethylacrylate and N,N-methylenediacrylamide.

18. The method of claim 14 wherein said polyvinylidene monomer is divinylbenzene.

19. The method of claim 14 wherein said functional monomer is a monovinyl compound.

20. The method of claim 19 wherein said monovinyl compound bears a polar moiety or an ionic moiety.

21. The method of claim 14 wherein said functional monomer is selected from the group consisting of N-methyl-N-vinylacetamide, aminostyrene, methylacrylate, ethylacrylate, hydroxyethylacrylate, hydroxyethylacrylate, and N-vinylcaprolactam.

22. The method of claim 14 wherein said functional monomer is N-methyl-N-vinylacetamide.

23. The method of claim 22 wherein said functionalized polymer bead comprises 0.5–3.0 millimoles of N-methyl-N-vinylacetamide per gram of functionalized polymer bead.

24. The method of claim 14 wherein said functional monomer is selected from the group consisting of N-(4-vinylbenzyl)-N,N-dimethylamine, vinylbenzyltrimethylammonium chloride, 4-vinylbenzoic acid, styrene sulfonic acid and methacrylic acid.

25. The method of claim 14 wherein said functional monomer is glycidylmethacrylate.

26. The method of claim 25 further comprising:
   c) reacting the functionalized polymer bead produced by step (b) with ethylenediamine, diethylamine, polyethyleneimine, hydroxypropyl sulfonic acid, hydroxylbenzene sulfonic acid or hydroxybenzoic acid.

27. The method of claim 25 further comprising:
   c) reacting the functionalized polymer bead produced by step (b) with ethylenediamine.

28. The method of claim 14 wherein step (b) is catalyzed by a free radical under anaerobic conditions.

29. The method of claim 28 wherein a free radical catalyst is utilized, said free radical catalyst being selected from the group consisting of benzoyl peroxide, tert-butylbenzoate, caproyl peroxide, azodiisobutyronitrile and azodiisobutyramide.

30. The method of claim 29 wherein said free radical catalyst is azodiisobutyronitrile.

31. A method of separating an analyte from a solution comprising said analyte and a first solvent, said method comprising contacting said solution with functionalized polymer beads of claim 1 whereby said analyte is adsorbed onto said functioned polymer bead.

32. The method of claim 31 wherein, after contacting said fictionalized polymer beads with said solution, said functionalized polymer beads are washed with said first solvent.

33. The method of claim 31 wherein said analyte is released from said functionalized polymer beads by washing said functionalized polymer beads with a second solvent.

34. The method of claim 32 wherein said first solvent is aqueous.

35. The method of claim 33 wherein said second solvent is methanol.

36. The method of claim 31 wherein said analyte is selected from the group consisting of acetaminophen, resorcinal, pindolol, procainamide, primidone, phenobarbital, niacinamide and bupivacaine.

37. The method of claim 31 wherein said functionalized polymer beads comprise N-methyl-N-vinylacetamide functional groups.

38. A method of separating analytes in a mixture by passing said mixture through a column of functionalized polymer beads of claim 1.

39. The method of claim 38 wherein an aqueous buffer is used as a mobile phase.

40. The method of claim 38 wherein said method comprises high performance liquid chromatography.

41. The method of claim 38 wherein said analytes are organic acids.

42. The method of claim 38 wherein said analytes are isomers of each other.

43. The method of claim 38 wherein said functionalized polymer beads comprise N-methyl-N-vinylacetamide.

44. The method of claim 38 wherein said functionalized polymer beads comprise an anion exchanger.

45. The method of claim 44 wherein said functionalized polymer beads comprise vinylbenzyltrimethylammonium chloride.

46. The method of claim 38 wherein said analytes are separated by washing said functionalized polymer beads with a series of solvents.

47. The method of claim 46 wherein said series of solvents comprises methanol an acid, and acidified methanol.

* * * * *